(12) United States Patent
Tachikawa et al.

(10) Patent No.: US 7,882,367 B2
(45) Date of Patent: Feb. 1, 2011

(54) INFORMATION RECORDING AND REPRODUCING APPARATUS AND METHOD

(75) Inventors: Takayuki Tachikawa, Hamura (JP); Hiroyuki Kamio, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 914 days.

(21) Appl. No.: 11/806,602

(22) Filed: Jun. 1, 2007

(65) Prior Publication Data

US 2008/0002828 A1    Jan. 3, 2008

(30) Foreign Application Priority Data

Jun. 12, 2006   (JP) ............................. 2006-162669

(51) Int. Cl.
H04L 9/14    (2006.01)
H04L 9/30    (2006.01)
(52) U.S. Cl. .................. 713/193; 726/26; 380/281; 380/284
(58) Field of Classification Search ................ None
See application file for complete search history.

(56) References Cited

U.S. PATENT DOCUMENTS

| | | | | |
|---|---|---|---|---|
| 5,726,956 | A * | 3/1998 | Kanno | 369/30.06 |
| 6,738,878 | B2 | 5/2004 | Ripley et al. | |
| 7,339,869 | B2 * | 3/2008 | Ishibashi et al. | 369/53.21 |
| 7,353,541 | B1 * | 4/2008 | Ishibashi et al. | 726/26 |
| 7,650,646 | B2 * | 1/2010 | Asano et al. | 726/32 |
| 7,707,375 | B2 * | 4/2010 | Nabekura | 711/162 |
| 2001/0021255 | A1 | 9/2001 | Ishibashi | |
| 2004/0156503 | A1 | 8/2004 | Bell et al. | |
| 2004/0172549 | A1 | 9/2004 | Kojima et al. | |
| 2005/0016284 | A1 | 1/2005 | Bernhard | |
| 2005/0038997 | A1 | 2/2005 | Kojima et al. | |
| 2008/0154633 | A1 * | 6/2008 | Ishibashi et al. | 705/1 |
| 2009/0222929 | A1 * | 9/2009 | Noguchi et al. | 726/27 |

FOREIGN PATENT DOCUMENTS

| | | |
|---|---|---|
| EP | 1 659 584 A1 | 5/2006 |
| JP | 2005-039480 | 2/2005 |
| WO | 03/049106 A2 | 6/2003 |
| WO | 2006/074987 A2 | 7/2006 |

OTHER PUBLICATIONS

Intel Corporation et al., "Advanced Access Content System (AACS) Recordable Video Book", Feb. 17, 2006, Revision 0.91, pp. 1-13.
Intel Corporation et al., "Advanced Access Content System (AACS) HD DVD Recordable Book", Apr. 26, 2006, Revision 0.92, pp. 1-57.
European Search Report corresponding to Application No. EP 07 10 7517 dated Sep. 18, 2007.

* cited by examiner

*Primary Examiner*—Christopher A Revak
(74) *Attorney, Agent, or Firm*—Pillsbury Winthrop Shaw Pittman, LLP

(57) ABSTRACT

According to one embodiment of the invention, there is provided an information recording and reproducing apparatus which records information in a recording medium and reproduces information recorded in the recording medium, the information recording and reproducing apparatus includes a first recording section which records in the recording medium an encrypted encryption key aggregate where at least one encryption key for encrypting each of a plurality of pieces of information has been encrypted and registered and information encrypted using the encryption key, a second recording section which records encrypted first private key information used to encrypt or decrypt the encryption key into the recording medium and which, if the encrypted encryption key aggregate has not been recorded in the recording medium, records the first private key information into the recording medium only when the encrypted encryption key aggregate is recorded in the recording medium.

8 Claims, 11 Drawing Sheets

| Data name | Size | Storage location on Medium | Usage |
|---|---|---|---|
| Media ID | 128bit | BCA | Media ID MAC generation and verification |
| Binding Nonce (x) | 128bit | Protected Area (Protected Area of File in which Encrypted Title Key has been stored) | Protected Area Key Calculation (Encrypted Title Key and Media ID MAC are written simultaneously) |
| Binding Nonce (y) | | | |
| Binding Nonce (z) | | | |
| MKB (Lead-in) | – | Lead-in Area | Media Key generation |

FIG. 6

| Data name | Size | Storage location on Medium | Usage |
|---|---|---|---|
| Management information M_VOB_GI | – | User Data Area (IFO) | Information on Copy Protection pointers of VOB or SOB to be scrambled or descrambled has been stored |
| Management information SOBI_GI | – | | |
| MKB (Read/Write MKB) | – | User Data Area | Media Key generation |
| Encrypted Title Key (x) | 128bit* 1998 | | Scramble/Descramble process |
| Media ID MAC (x) | 128bit* 1998 | | Media ID MAC generation and verification |
| Encrypted Title Key (y) | 128bit* 1998 | | Scramble/Descramble process |
| Media ID MAC (y) | 128bit* 1998 | | Media ID MAC generation and verification |
| Encrypted Title Key (z) | 128bit* 1998 | | Scramble/Descramble process |
| Media ID MAC (z) | 128bit* 1998 | | Media ID MAC generation and verification |
| Usage Rule | 128bit* 1998 | | Scramble/Descramble process |
| Management Info (backup) | – | | Information on Copy Protection pointers of VOB or SOB to be scrambled or descrambled has been stored |
| MKB (Read/Write MKB backup) | – | | Media Key generation |
| Usage Rule (backup) | 128bit* 1998 | | Scramble/Descramble process |

FIG. 7

| Bit<br>Byte | 7 | 6 | 5 | 4 | 3 | 2 | 1 | 0 |
|---|---|---|---|---|---|---|---|---|
| 0<br>:<br>11 | (msb) STKF_ID (lsb) ||||||||
| 12<br>:<br>15 | (msb) HR_STKF_EA (lsb) ||||||||
| 16<br>:<br>31 | reserved ||||||||
| 32<br>33 | (msb) VERN (lsb) ||||||||
| 34<br>:<br>127 | reserved ||||||||
| 128<br>:<br>143 | (msb) Title Key File Generation (lsb) ||||||||
| 144<br>:<br>159 | (msb) Title Key File Nonce (lsb) ||||||||
| 160<br>:<br>175 | (msb) Encrypted Title Key ($K_{te}$)#1 (lsb) ||||||||
| 176<br>:<br>191 | (msb) Media ID MAC ($MAC_{id}$)#1 (lsb) ||||||||
| 192<br>:<br>64095 | Encrypted Title Key, Media ID MAC (#2..#1998) ||||||||
| 64096<br>:<br>65535 | reserved ||||||||

Rows 160–64095 are grouped as Title Key Information (TKI).

FIG. 8

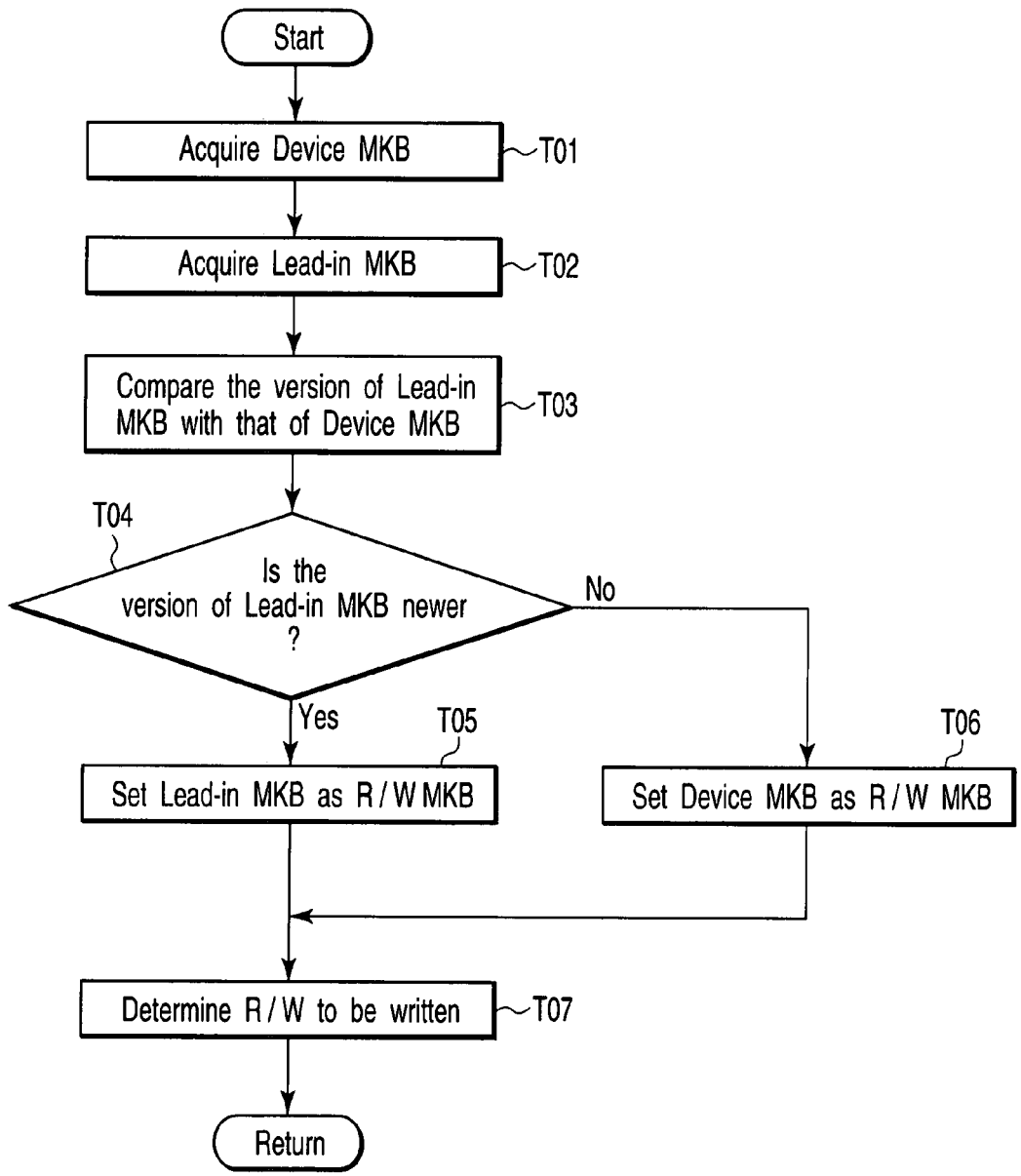
F I G. 10

INFORMATION RECORDING AND REPRODUCING APPARATUS AND METHOD

CROSS-REFERENCE TO RELATED APPLICATION

This application is based upon and claims the benefit of priority from Japanese Patent Application No. 2006-162669, filed Jun. 12, 2006, the entire contents of which are incorporated herein by reference.

BACKGROUND

1. Field

One embodiment of the invention relates to a method of recording or reproducing an encryption key or the like, information requested to have a high confidentiality. This invention further relates to a reproducing apparatus which uses stored or recorded highly confidential data.

2. Description of the Related Art

In recent years, various reproducing apparatuses capable of reproducing AV contents recorded on a disc medium, such as a DVD (Digital Versatile Disc), have been developed. Such reproducing apparatuses include a recorder with a dedicated player or a reproducing function, and a personal computer provided with a DVD disc drive and a reproducing software program. Stream data recorded on a DVD disc or the like to be played back on such a reproducing apparatus has been encrypted to prevent the data from being copied. An encryption scheme conforming mostly to the CCS (Content Scramble System) method has been applied to the encrypted stream data part. As a higher encryption scheme, AACS (Advanced Access Content System) has been proposed (refer to Jpn. Pat. Appln. KOKAI Publication No. 2005-39480). When the AACS method is used, for example, a reproducing apparatus set manufacturer gets a specific key set from a key tree the licenser has, encrypts different combinations of keys, and incorporates the encrypted keys into individual reproducing apparatuses.

In the AACS, to prevent unauthorized copying, data called MKB (Media Key Block) is used. MKB is mathematically systematic data obtained by encrypting a media key (Km), a base key of content encryption, using an aggregate of device keys (Kd) provided as private keys in reproducing apparatuses. Moreover, in MKB, information on unauthorized apparatuses has been recorded, thereby preventing the unauthorized apparatuses from taking out the media key (Km).

Since information on unauthorized apparatuses is updated, a new MKB has to be used. Therefore, in the AACS, there are three types of MKB: Lead-in MKB embedded in the Lead-in Area of a medium, Read Write MKB stored as a file in a medium, and Device MKB stored in its internal nonvolatile memory by the apparatus itself. Of them, the latest MKB is supposed to be written over Read Write MKB.

Content protection using such MKB is a technology for effectively preventing unauthorized use of DVD media contents. To maintain this functionality, MKB has to be updated as needed. Since the update is made by writing MKB over Read Write MKB, frequent updating of MKB leads to a decrease in the response of the system.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 6 is an exemplary diagram showing data on media needed in a recording and reproducing process in the AACS according to the first embodiment;

FIG. 7 is an exemplary diagram showing data on media needed in a recording and reproducing process in the AACS according to the first embodiment;

FIG. 8 is an exemplary diagram showing the structure of an encrypted title key file according to the first embodiment;

FIG. 10 is an exemplary flowchart to help explain the basic procedure for processing MKB according to the first embodiment.

DETAILED DESCRIPTION

Various embodiment according to the invention will be described hereinafter with reference to the accompanying drawings.

When information is recorded onto an information recording medium, such as an optical disc, information might be requested to be encrypted and recorded. For example, in a copyright protection system, contents, a written work, are encrypted using an encryption key to produce encrypted contents. To conceal the encryption key used in encryption, the encryption key is encrypted using another encryption key to produce an encrypted key. Then, the encrypted key, together with the encrypted contents, is recorded onto a recording medium, thereby preventing illegal copying.

In a copyright protection system related to DVDs (Digital Versatile Discs) whose market is expanding rapidly at present, the following actions have been taken: DVD video uses the CSS (Content Scramble System) method licensed by the DVD CCA (DVD Copy Control Association); and reproduce-only DVD Audio uses the CPPM (Content Protection for Prerecorded Media) method. Moreover, in a copyright protection system for contents recorded in recording media, the CPRM (Content Protection for Recordable Media) method has been used. The CPPM method and CPRM method are licensed by a specific association. The specific association is, for example, an association called 4C Entity or LCC.

On the other hand, the development of a high-capacity next-generation DVD or the like which enables high-definition images and audio signals to be recorded and reproduced is being advanced. In a copyright protection system for a case where a high-definition work is written onto such a next-generation recording medium, the introduction of a method whose security capability is higher than that in the prior art is requested.

A method of managing a content key in the AACS, a content protection technique used in the HD DVD (High Density Digital Versatile Disc) Video Recording format, will be explained.

In the conventional CPRM method, an encryption key is generated using a media key block (MKB) and media ID (Media ID) present on the disc, thereby encrypting contents. On the other hand, in the AACS method, the contents of the disc do not share a common encryption key and are encrypted using a separate encryption key corresponding to each content.

Figure 1:
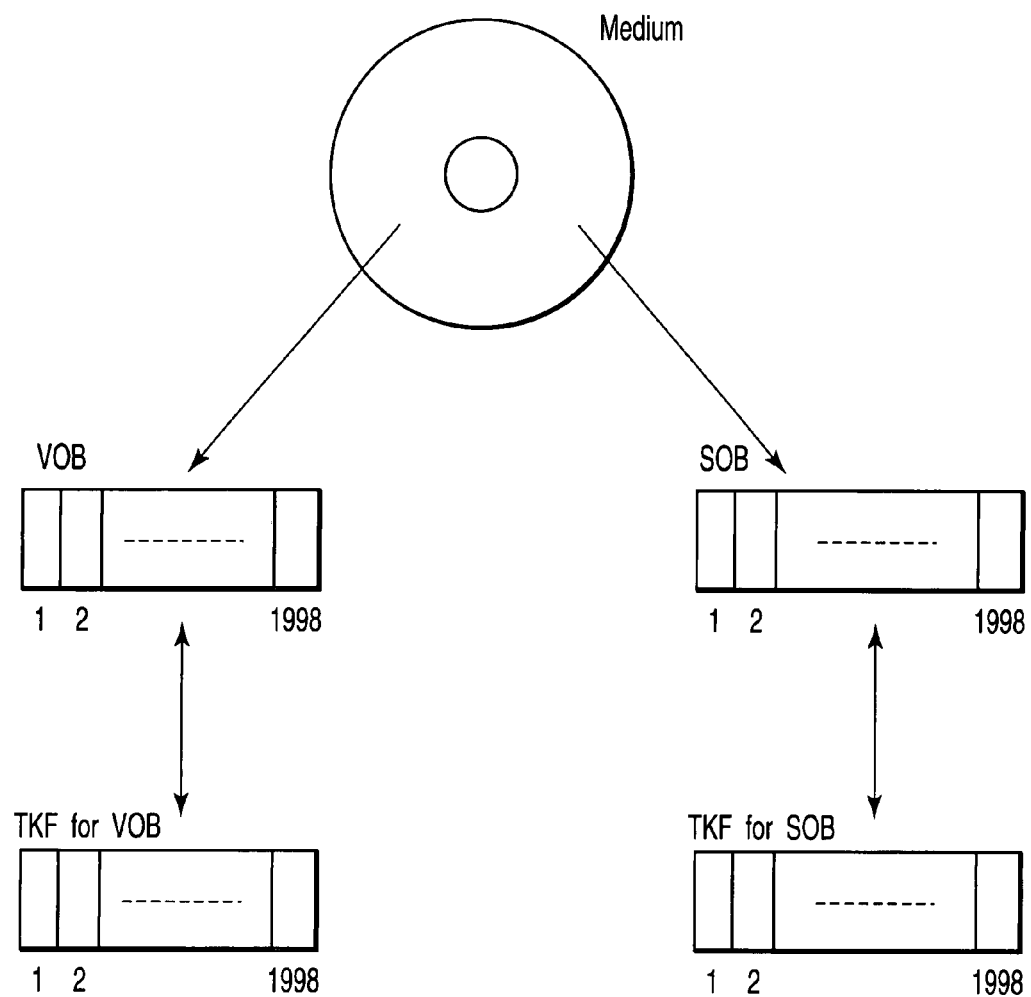
FIG. 1 is an exemplary diagram showing a data structure in a medium according to a first embodiment of the invention.

FIG. 1 shows a data configuration of a medium.

Up to 1998 video objects (VOBs), which are MPEG2 contents used in conventional DVDs, and up to 1998 stream objects (SOBs) used in a HDDV or the like can be stored in a single medium according to the standard.

As described above, while in the conventional method, one encryption key was shared by all of the objects, the AACS method performs encryption using a different encryption key for each content.

The encryption key for each content is stored in a title key file (TKF). Specifically, there are provided a video object title key file and a stream object title key file. Each of the tile key files can store 1998 title keys (Encrypted Title Keys: E-TKs).

Figure 2:
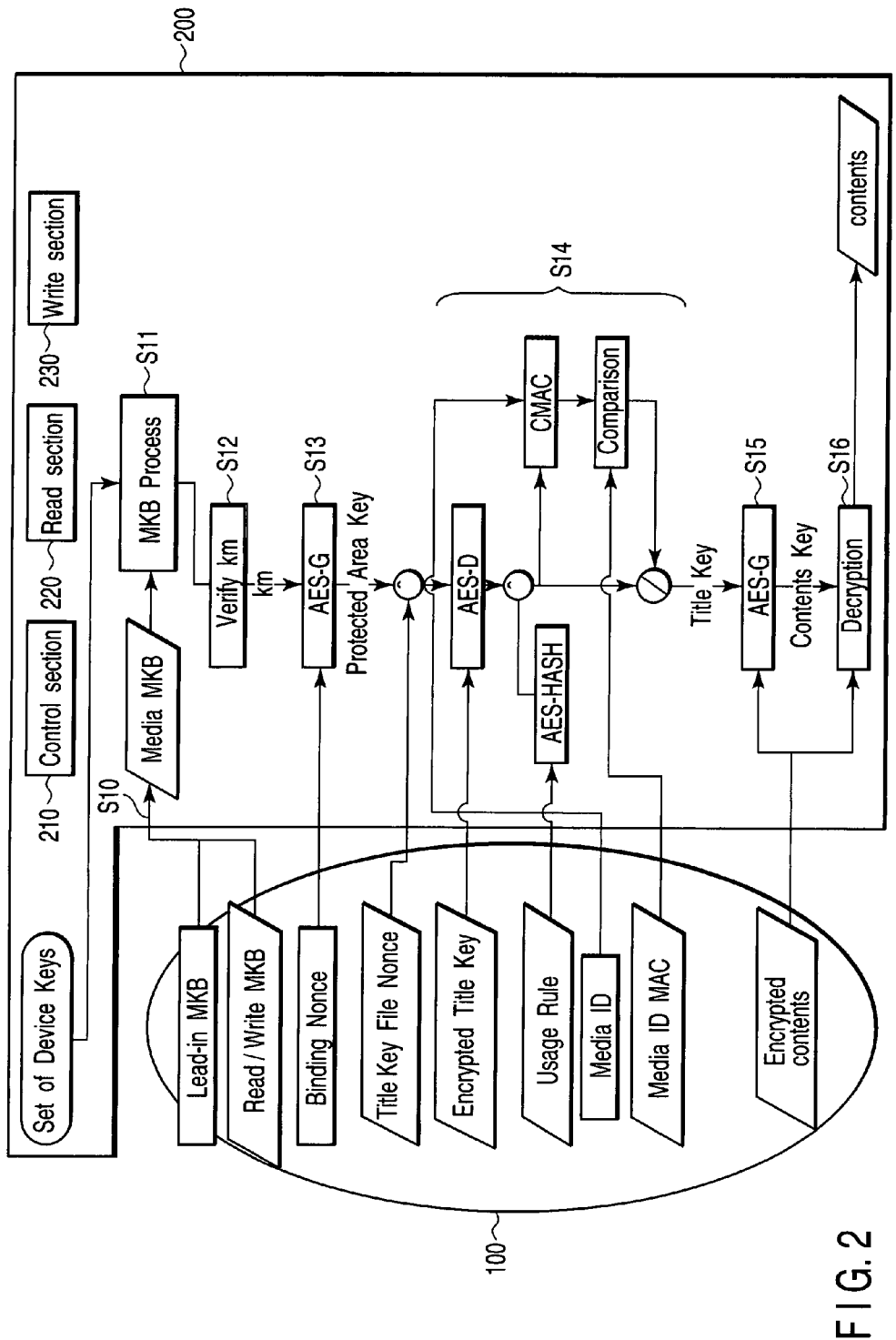
FIG. 2 is an exemplary diagram to help explain the process of decrypting encrypted contents recorded in a medium according to the first embodiment.

FIG. 2 is a diagram to help explain the process of decrypting encrypted contents (E-contents) recorded in a medium. FIG. 2 shows information stored in a medium 100 in which contents and others have been recorded, the processing functions provided in an information recording and reproducing apparatus 200, and the flow of data between them.

The information recording and reproducing apparatus 200 comprises a control section 210, a read section 220, and a write section 230. The control section 200 controls the various functions and processing operations of the information recording and reproducing apparatus 200 of FIG. 2. The read section 220 reads data from the medium 100 into the information recording and reproducing apparatus 200. The write section 230 writes data in the information recording and reproducing apparatus 200 into the medium 100.

In the medium 100, a Lead-IN MKB (Media Key Block) is stored in a Lead-IN area, a Read-Only area, and Read/Write MKB is stored in a User Data Area, a rewritable area.

MKB is mathematically systematized private key information (media key block) which is obtained by encrypting a media key (Km), a base key of content encryption, using an aggregate of device keys (Kd) provided as private keys in the recording and reproducing apparatus 200 and which has been encrypted to encrypt or decrypt a title key (TK).

In block S10, the versions of Lead-in MKB and Read Write MKB recorded on the medium 100 are compared with each other and the latest one is read as Media MKB. Then, in block S11, an MKB process is carried out using Device Key Set and Media MKB stored in the information recording and reproducing apparatus 200. Device Key Set is composed of a plurality of device keys Kd.

In the MKB, not only is information for generating a protected area key (Kpa) encrypted and stored, but also revoke information is included. Specifically, when there is a security hole in a certain device key set and the use of the device key Kd corresponding to the licenser is banned, revoke information on the corresponding device key Kd is written. The revoke information prevents encrypted data from being decrypted with a device having the corresponding device key Kd. Since information on the unauthorized devices is updated, a new MKB has to be used. Therefore, as described above, the latest one is used as Media MKB.

By this MKB process, a media key (Km) is generated. In block S12, the generated media key is verified. If the result of the verification has shown that the generated media key is unauthorized, the Device Key Set is regarded as unauthorized and the process related to AACS is terminated.

On the other hand, in the protect area in the begin address of the title key file (TKF), data based on random numbers connected to a file called Binding Nonce has been written. The Binding Nonce cannot be copied using, for example, a Write instruction on a PC (personal computer) and can only be copied using an instruction defined in AACS. As described above, only hardware licensed by the AACS is permitted to make a copy, thereby preventing the leakage of information via the PC.

Next, in block S13, a Kpa process, an encryption process, is carried out using Km and Binding Nonce. In the Kpa process, AES (Advanced Encryption Standard)—G, a cryptographic algorithm, is used. As a result of the Kpa process, a protected area key (Kpa) is generated.

Next, a title key process to generate a title key (TK) from Kpa shown in block S14 will be explained.

In the title key file (TKF), random number data called Title Key File Nonce (TKFN) has been stored. The TKFN is random number data used to encrypt a title key in an encryption process (described later).

In addition, the disc is provided with a Usage Rule File in which rules on the use of contents have been written. In the Usage Rule File, Usage Rule, information as to whether the rules on use are applied, is represented as Bit information, 0 or 1.

Furthermore, in a burst cutting area (BCA), a read-only area of the disc, Media ID has been stored. The Media ID is a unique ID added to each medium. In a user data area, a rewritable area, Media ID MAC, Message Authentication code MAC using Media ID, has been stored.

In a title key process shown in block S14, a process using an AES-D algorithm is carried out on the basis of the result of processing the above-described Usage Rule, Kpa, and TKFN, and the encrypted title key (T-TK) is decrypted, thereby generating a title key (TK). At this time, the MAC generated using Media ID stored in BCA is compared with Media ID MAC stored on the disc, thereby verifying that there is no alteration.

In block S15, the TK generated this way and the encrypted contents (E-contents) are processed using an AES-G algorithm, thereby generating a content key. In block S16, using this content key, the encrypted contents (E-contents) are decrypted, thereby generating contents.

Figure 3:
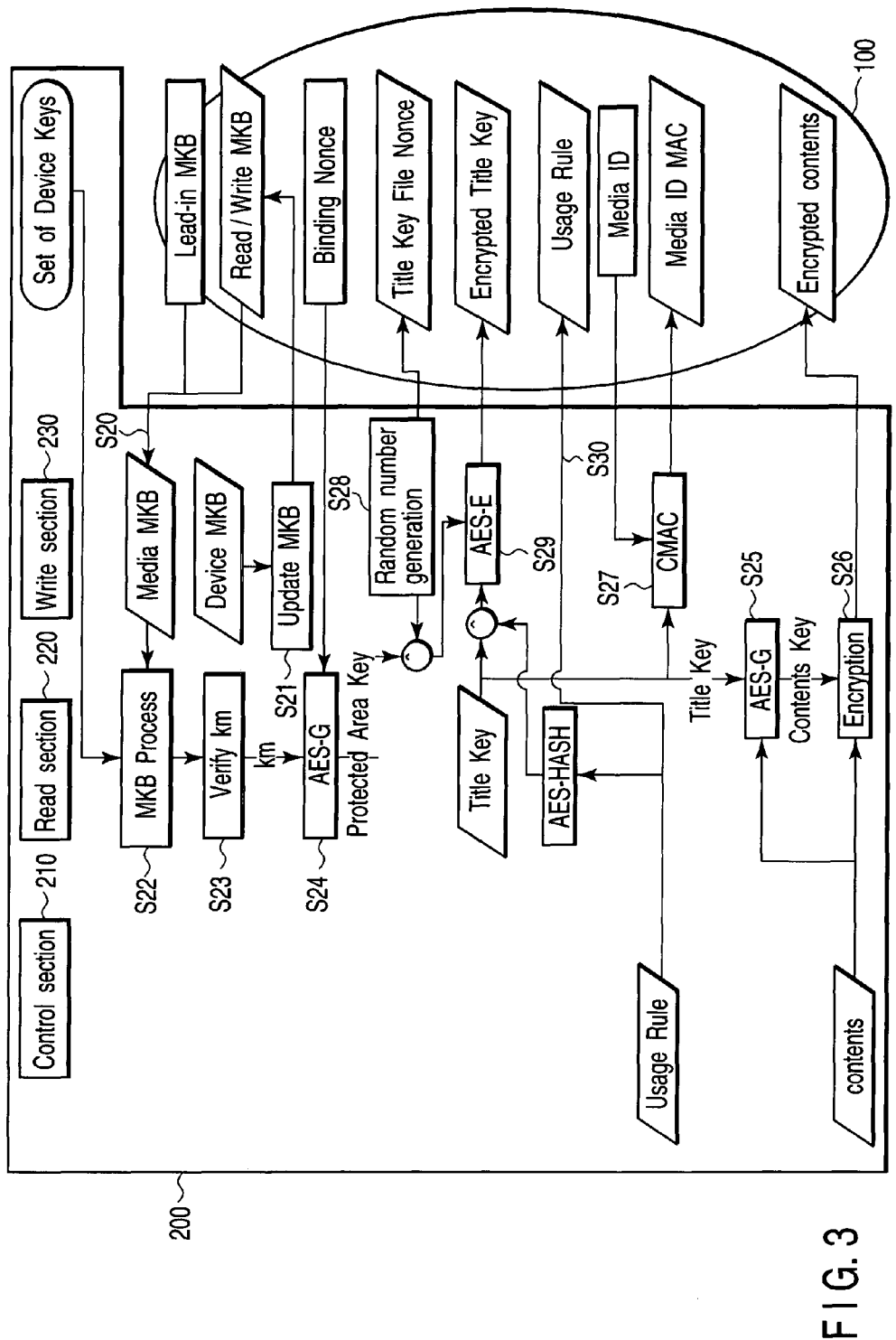
FIG. 3 is an exemplary diagram to help explain the process of encrypting contents and recording the resulting contents onto a DVD according to the first embodiment.

FIG. 3 is a diagram to help explain the process of encrypting contents and recording the resulting contents onto a DVD. Since the terms used are the same as in FIG. 2, a repeated explanation will be omitted.

In block S20, the versions of Lead-in MKB and Read Write MKB recorded on the medium 100 are compared with each other and the latest one is read as Media MKB. Next, the version of Media MKB and that of Device MKB held by the information recording and reproducing apparatus 200 are compared with each other. If the version of Device MKB is newer, an MKB update process is started and the value of Device MKB is updated to Read Write MKB in block S21. If the version of Media MKB is newer, whether to update the value of Device MKB is determined, depending on the set specification. In block S22, an MKB process is carried out using the Device Key Set stored in the information recording and reproducing apparatus 200 and Media MKB.

By this MKB process, a media key (Km) is generated. In block S23, the generated media key is verified. If the result of the verification has shown that the generated media key is unauthorized, the Device Key Set is regarded as unauthorized and the process related to AACS is terminated.

In block S24, using Km and Binding Nonce, a Kpa process, an encryption process, is carried out. As a result of the Kpa process using AES-G, a protected area key (Kpa) is generated.

In block S25, the title key (TK) and contents are processed using an AES-G algorithm, thereby generating a content key. In block S26, using this content key, contents are encrypted, thereby generating E-contents, which are then recorded on the medium 100.

In block S27, using Media ID and TK, an MAC is generated. The MAC is stored as Media ID MAC onto the medium 100.

In block S28, random number data used to encrypt the title key is generated and recorded as Title Key File Nonce onto the medium.

In block S29, on the basis of the result of the process of hashing the Usage Rule and Kpa and TK, a process using an AES-E algorithm is carried out, thereby generating an encrypted title key (E-TK), which is then stored onto the medium. In block S30, the Usage Rule is stored onto the medium 100.

As described above, in encrypting or decrypting contents, the title keys and others play a key role. However, since the title key and others are recorded as a readable/writable file on the medium, if the surface of the medium becomes dirty with fingerprints or the like, there is a possibility that contents cannot be read out easily. Therefore, in AACS, the title key file (TKF) in which information including the title key and others have been stored is backed up.

Figure 4:
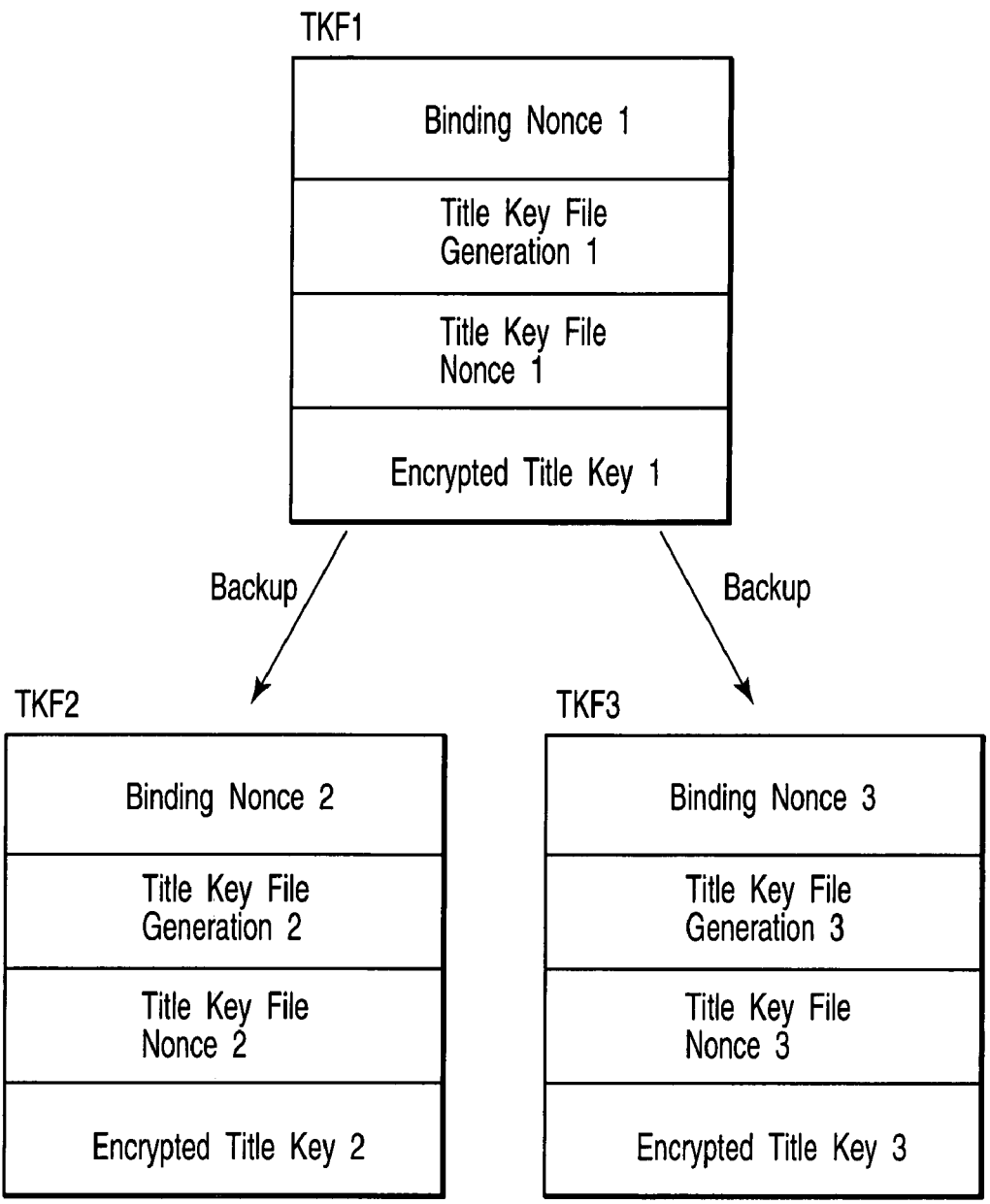
FIG. 4 is an exemplary diagram showing the structure of a title key file and that of a title key file as its backup file according to the first embodiment.

FIG. 4 is a diagram showing the structure of a title key file and that of a title key file as its backup file. In an explanation of the backup method, a title key file is referred to as TKF1, a title key file as a backup file is referred to as TKF2 or TKF3. TKF1 to TKF3 are stored on the medium 100.

In each of the title key files (TKF1 to TKF3), Binding Nonce (BN1, BN2, BN3), Title Key File Generation (Generation), Title Key File Nonce (TKFN 1 to TKEF 3), and encrypted title keys (ETK1 to ETK3) are registered.

(BN1, BN2, BN3) are random number data used to encrypt its own title key file as described above. (Generation) shows the number of times each of the title files (TKF1 to TKF3) was updated.

(TKFN1, TKFN2, TKFN3) are random numbers for generating encryption title keys (ETK1, ETK2, ETK3) of files other than its own title key file or backup file.

The encryption title keys (ETK1, ETK2, ETK3) are expressed by the following equations (1) to (3):

$$ETK1 = f(TK, BN1, TKFN3) \qquad (1)$$

$$ETK2 = f(TK, BN2, TKFN1) \qquad (2)$$

$$ETK3 = f(TK, BN3, TKFN2) \qquad (3)$$

where TK represents a title key of plain text and f indicates that a first parameter (TK) is encrypted using second parameters (BN1 to BN3) and third parameters (TKFN1 to TKFN3) as encryption keys. In the encryption process f, for example, a well-known algorithm, such as AES (Advanced Encryption Standard), may be used.

Specifically, TKF1 is related to TKF3 and the title key (TK) is encrypted using (BN1) and the TKF3 related to TKF1 (TKFN3). TKF2 is related to TKF1 and the title key (TK) is encrypted using (BN2) and the TKF1 related to TKF2 (TKFN1). TKF3 is related to TKF2 and the title key (TK) is encrypted using (BN3) and the TKF2 related to TKF3 (TKFN2).

As described above, the title key file TKF1 and each of the backup files TKF2, TKF3 are related to one another. The encrypted title keys (E-TK1, E-TK2, E-TK3) are obtained by encrypting the title key (TK) using (BN1, BN2, BN3) registered in their own files and (TKFN1, TKFN2, TKFN3) registered in related other files.

As described above, when three TKFs are stored and TKFN is stored in another file, even if one TKF has been destroyed due to data corruption, the corrupted data can be restored from the data in the remaining two TKFs.

The above-described Binding Nonce is set as data that can be read and written using only a special drive command, which prevents unauthorized copying. That is, even if TKF has been copied, since Binding Nonce attached to it has not been copied, it is possible to prevent a malicious third party from encrypting and decrypting data illegally.

Figure 5:
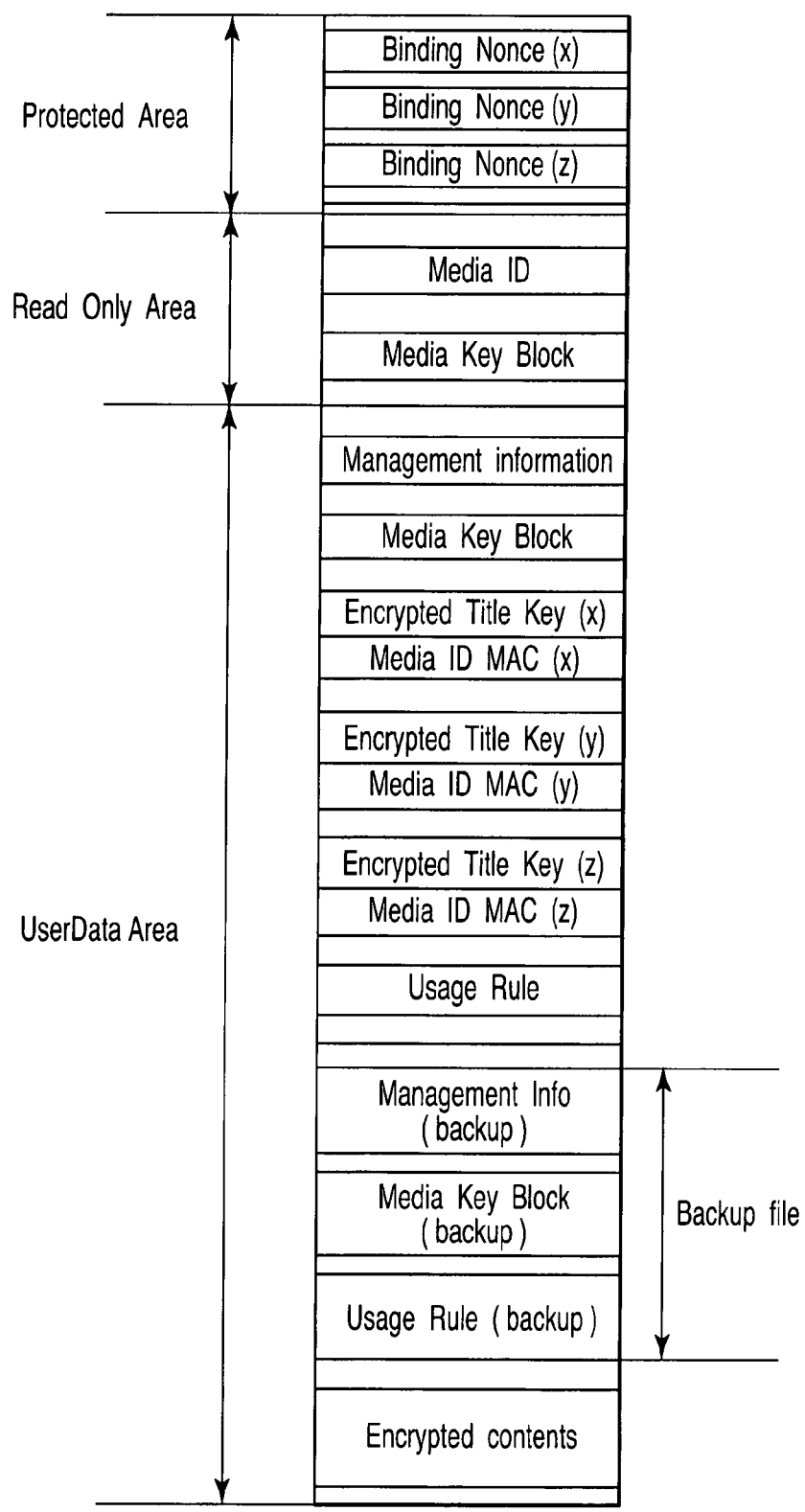
FIG. 5 is an exemplary diagram showing data on media needed in a recording and reproducing process in the AACS according to the first embodiment.

Referring to FIGS. 5, 6, and 7, data on a medium needed in a recording and reproducing process in the AACS will be explained in detail.

In a Protected Area on a medium, or a Protected Area for a file in which E-TK has been stored, Binding Nonce and its backup data have been stored.

Moreover, in BCA (Burst Cutting Area) in a Read Only Area on the medium, Media ID has been recorded. In a Lead-In Area, Lead-in MKB has been recorded.

In a User Data Area on the medium, management information, information on Copy Protection pointers of a video object (VOB) and a stream object (SOB), has been stored. Further stored in the User Data Area are Read/Write MKB, encrypted title key (E-TK), Media ID MAC, Usage Rule, and their backup files. Still further, up to 1998 encrypted contents can be stored in the User Data Area.

FIG. 8 shows the structure of an encrypted title key file (E-TKF). While in FIG. 8, the structure of E-TKF in a stream object (SOB) is shown, the same structure is also used in a video object (VOB).

In byte 0 to byte 15, fixed information (STKE_ID, HR_ST-KF_EA) for specifying a title key file has been written. In byte 32 and byte 33, the version number of AACS has been written. In byte 128 to byte 143, Title Key File Generation has been stored. In byte 144 to byte 159, Title Key File Nonce has been stored.

In byte 160 to byte 64095, 1998 sets of an encrypted title key (E-TK) and Media ID MAC have been written as Title Key Information (KTI).

Each of the contents is encrypted using one of the 1998 title keys. There is no need to record an Encrypted Title Key in all of the 1998 title keys. In the unused title keys, what is obtained by encrypting a value of 0 in a TK process is written.

In Title Key File Generation, a value incremented each time the file is updated has been written. As described above, the title key file includes a total of three files for backup purposes. If none of the values of the Title Key File Generation of the three files coincide with one another, this means that some failure has occurred during writing data into a file.

Next, a method of updating MKB will be explained.

As described above, in MKB, information on unauthorized devices has been stored. If the version of MKB is new, this means that information on new unauthorized devices has been added and registered. Accordingly, it is desirable that a newer MKB should be widely used from the viewpoint of prevention of illegal acts.

In AACS, three types of MKB are used.

Lead-in MKB has been recorded in the Lead-in Area, an unrewritable area on the disc. Lead-in MKB is data that the disc manufacturer writes each time it manufactures a disc. Therefore, on a newly manufactured disc, an MKB of a new version has been written.

Device MKB is such data as is recorded in a nonvolatile storage area of a device by the device manufacturer that buys a device key together with the MKB. Under the current agreement, device manufacturers buy new MKBs every three months and replace the Device MKB with an MKB of a new version before shipment.

For example, when old media have been used with the same apparatus, the version of MKB has not been updated. Therefore, when old media are used with a newly purchased apparatus, MKB of the new version is recorded in a rewritable area of the old medium. The MKB stored on the disc and constantly updated to a new version is referred to as Read Write MKB.

Figure 9:
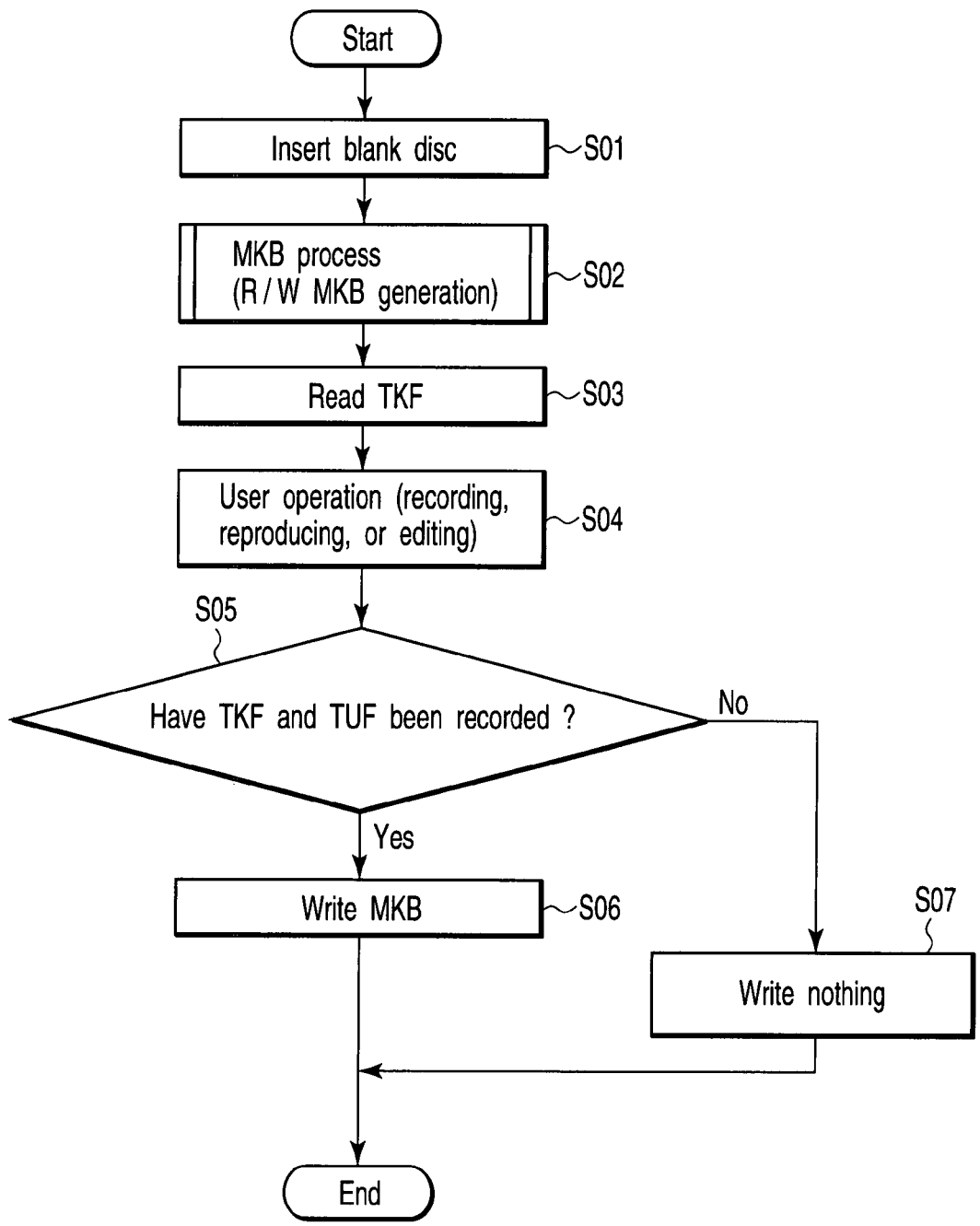
FIG. 9 is an exemplary flowchart to help explain the basic procedure for writing MKB onto a blank disc according to the first embodiment.

FIG. 9 is a flowchart to help explain the basic procedure for writing MKB onto a blank disc.

In block S01, when the user turns on the power supply of the information recording and reproducing apparatus 200, or when the user inserts a disc on which no content has been recorded, an MKB process (see FIG. 10) is executed in block S02.

In block T01 of FIG. 10, the control section 210 acquires Device MKB stored in the nonvolatile area of the information recording and reproducing apparatus 200. In block T02, Lead-in MKB recorded in the Lead-in area of the medium 100 is acquired. In block T03, the version of Device MKB is compared with the version of Lead-in MKB. The version number is recorded in the beginning part of each MKB.

If Yes in block T04, or if the version of Lead-in MKB is new, Lead-in MKB is set as Read Write MKB in block T05.

On the other hand, if No in block T04, or if the version of Device MKB is new, Device MKB is set as Read Write MKB in block T05.

In block T07, MKB to be written is determined.

Returning to FIG. 9, in block S03, the title key file (TKF) is read. That is, the title key file on the medium 100 is expanded on an SDRAM.

Then, in block S04, whether to update Read Write MKB is determined according to a content recording operation, a content reproducing operation, a content editing operation, or a content deleting operation conducted by the user.

If Yes in block S05, or if the title key file (TKF) and title usage file (TUF) have been recorded according to the operation performed by the user, the determined MKB is written in Read Write MKB in block S06.

On the other hand, if No in block S05, or if the title key file and title usage file have not been recorded into, the determined MKB is not written in Read Write MKB in block S07.

In the prior art, when the medium 100 was inserted in the information recording and reproducing apparatus 200 and the medium was ejected without the operation of recording contents, since Read Write MKB had been generated on the SDRAM even in that state, the data was written in Read Write MKB of the medium 100.

Consequently, although MKB is intended to protect recorded contents, a file of MKB is written wastefully even if there is no content to be protected.

Taking into account a possibility that another device, such as PC (personal computer), will use the HD DVD for another purpose, writing a file of MKB even if there is no content to be protected leads to a wasteful consumption of capacity.

To overcome this problem, as shown in block S07 of FIG. 9, if a blank medium is inserted, a determination is made so that MKB may be written on the medium 100 only when contents have been recorded on the medium, that is, only when TKF and TUF have been recorded.

Figure 11:
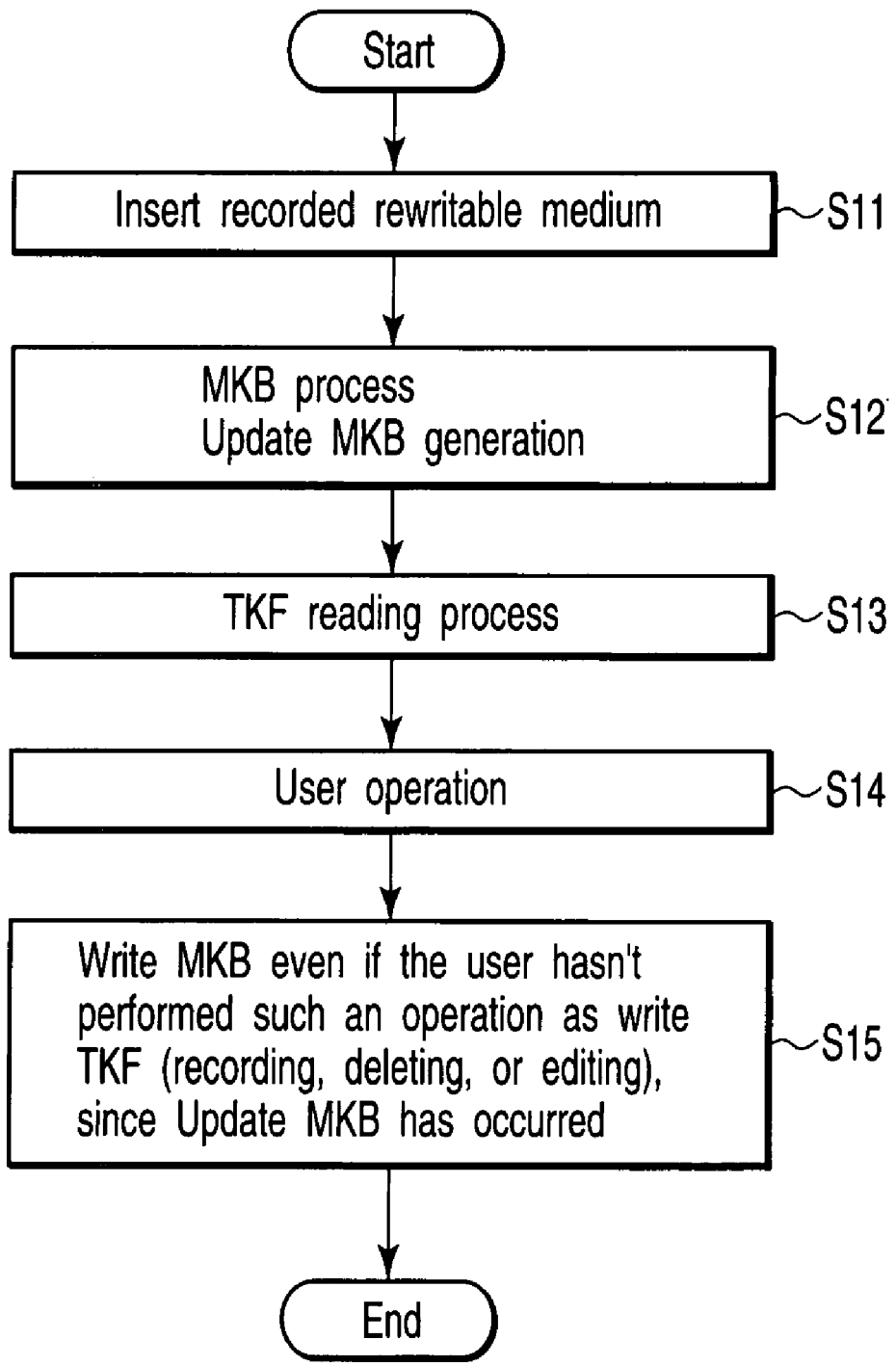
FIG. 11 is an exemplary flowchart to help explain the basic procedure of writing MKB into a recorded rewritable medium according to the first embodiment.

FIG. 11 is a flowchart to help explain the basic procedure of writing MKB into a recorded rewritable medium.

In a rewritable medium, the latest version of MKB has to be written as described above. Thus, if a reason for updating MKB occurs after the medium 100 is inserted, MKB is written on the medium 100 even if the user does not perform a TKF updating operation, such as recording, deleting, or editing.

In block S11 of FIG. 11, when the user turns on the power supply of the information recording and reproducing apparatus 200 and inserts a rewritable medium on which contents have been recorded, the MKB process is executed in block S12.

In the MKB process, the control section 210 acquires the Device MKB stored in the nonvolatile area of the information recording and reproducing apparatus 200 and Lead-in MKB and Read Write MKB recorded in the Lead-in area of the medium 100. Then, if the version of the Device MKB or that of the Lead-in MKB is newer than the version of the Read Write MKB, the control section determines that Update MKB has occurred.

If Update MKB has occurred, the media key (Km) is updated. Consequently, a title key file reencrypting process, that is, a title key file recording process, occurs.

In block S13, the title key file (TKF) is read. That is, the title key file on the medium is expanded on the SDRAM.

Then, in block S14, the user performs an operation.

However, since Update MKB has occurred in block S12, the latest one of the versions of Device MKB and Lead-in MKB is written in Read Write MKG, even if the user has not performed a title key file rewriting operation (such as recording, deleting, or editing).

In the recorded rewritable medium of FIG. 11, as described in FIG. 9, when the title key file and title usage files are not recorded, Read Write MKB is not written into.

The process of FIG. 11 is not applied to write-once media. The reason is that, if MKB is updated, the protected area key (Kpa) is updated and therefore TKF is updated. However, under AACS, of write-once media, only a blank disc is permitted to have TKF written into. Accordingly, the update of MKB is permitted on a rewritable disc, not on a write-once medium.

According to the above-described embodiment, Read Write MKB is prevented from being written wastefully even if contents to be protected in AACS have not been recorded, thereby reducing the number of write operations, which prevents the disc capacity from being consumed wastefully.

Furthermore, even if a disc has no Read Write MKB, comparing the version of the Lead-in MKB with that of the Device MKB enables the latest Read Write MKB to be written on a disc.

The invention may be applied not only to an HD DVD in the embodiment but also to an HDD and a semiconductor flash memory.

While a certain embodiment of the invention has been described, the embodiment has been presented by way of example only, and is not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the inventions.

What is claimed is:

1. An information recording and reproducing apparatus which records information in a recording medium and reproduces information recorded in the recording medium, the information recording and reproducing apparatus comprising:
   a first recording section which records in the recording medium an encrypted encryption key aggregate whereat least one encryption key for encrypting each of a plurality of pieces of information has been encrypted and registered and information encrypted using the encryption key, a second recording section which records encrypted first private key information used to encrypt or decrypt the encryption key into the recording medium and which, if the encrypted encryption key aggregate has not been recorded in the recording medium, records the first private key information into the recording medium only when the encrypted encryption key aggregate is recorded in the recording medium.

2. The information recording and reproducing apparatus according to claim 1, further comprising:
a third recording section which records second private key information and third private key information encrypted to encrypt or decrypt the encryption key in advance are recorded in the recording medium and the information recording and reproducing apparatus,
wherein the second recording section, when the encrypted encryption key aggregate has not been recorded in the recording medium, records the newer one of the versions of the second and third private key information as the first private key information into the recording medium.

3. The information recording and reproducing apparatus according to claim 1, further comprising:
a third recording section which records second private key information and third private key information used to encrypt or decrypt the encryption key in advance are recorded into the recording medium and the information recording and reproducing apparatus,
wherein the second recording section, when the encrypted encryption key aggregate has been recorded in the recording medium and at least the version of the second or third private key information is newer than the version of the first private key information, records the newer one of the versions of the second and third private key information as the first private key information into the recording medium.

4. The information recording and reproducing apparatus according to claim 3, wherein
the second recording section, when the encrypted encryption key aggregate has been recorded in the recording medium and the recording medium is a write-once medium, is prevented from recording the first private key information into the recording medium.

5. An information recording and reproducing method for an information recording and reproducing apparatus which records information in a recording medium and reproduces information recorded in the recording medium, the information recording and reproducing method comprising:
recording an encrypted encryption key aggregate where at least one encryption key for encrypting each of a plurality of pieces of information has been encrypted and registered and information encrypted using the encryption key,
recording encrypted first private key information used to encrypt or decrypt the encryption key into the recording medium,
wherein in the encrypted first private key information recording, if the encrypted encryption key aggregate has not been recorded in the recording medium, the first private key information is recorded into the recording medium only when the encrypted encryption key aggregate is recorded in the recording medium.

6. The information recording and reproducing method according to claim 5, further comprising:
recording second private key information and third private key information encrypted to encrypt or decrypt the encryption key in advance are recorded in the recording medium and the information recording and reproducing apparatus,
wherein the encrypted first private key information recording is, when the encrypted encryption key aggregate has not been recorded in the recording medium, to record the newer one of the versions of the second and third private key information as the first private key information into the recording medium.

7. The information recording and reproducing method according to claim 5, further comprising:
recording second private key information and third private key information encrypted to encrypt or decrypt the encryption key in advance are recorded into the recording medium and the information recording and reproducing apparatus,
wherein the encrypted first private key information recording is to record the newer one of the versions of the second and third private key information as the first private key information into the recording medium, when the encrypted encryption key aggregate has been recorded in the recording medium and the version of at least either second or third private key information is newer than the version of the first private key information.

8. The information recording and reproducing method according to claim 7, wherein
the encrypted first private key information recording is not to record the first private key information into the recording medium when the encrypted encryption key aggregate has been recorded in the recording medium and the recording medium is a write-once medium.

* * * * *